United States Patent
Cotten et al.

(10) Patent No.: US 7,470,119 B2
(45) Date of Patent: Dec. 30, 2008

(54) CONFECTION CENTER FILL APPARATUS AND METHOD

(75) Inventors: Gerald B. Cotten, Sparta, NJ (US); Donald Mihalich, Brooklyn, NY (US)

(73) Assignee: Wm. Wrighley Jr. Company, Chicago, IL (US)

( * ) Notice: Subject to any disclaimer, the term of this patent is extended or adjusted under 35 U.S.C. 154(b) by 774 days.

(21) Appl. No.: 10/847,733

(22) Filed: May 18, 2004

(65) Prior Publication Data

US 2005/0260317 A1 Nov. 24, 2005

(51) Int. Cl.
*A23G 3/12* (2006.01)
(52) U.S. Cl. ........................ 425/130; 425/191
(58) Field of Classification Search ............... 425/130, 425/131.1, 191
See application file for complete search history.

(56) References Cited

U.S. PATENT DOCUMENTS

| | | | | |
|---|---|---|---|---|
| 544,962 | A | * | 8/1895 | Copland ..................... 425/132 |
| 1,121,433 | A | * | 12/1914 | Westerman .................. 425/97 |
| 1,649,308 | A | * | 11/1927 | Hunter ..................... 425/133.1 |
| 2,214,325 | A | * | 9/1940 | Gothe ..................... 425/131.1 |
| 3,016,568 | A | * | 1/1962 | Gagne ......................... 425/191 |
| 3,018,516 | A | * | 1/1962 | Clinefelter ................. 425/199 |
| 3,184,358 | A | | 5/1965 | Utz |
| 3,241,503 | A | | 3/1966 | Schafer |
| 3,477,851 | A | | 11/1969 | Benson et al. |
| 3,605,645 | A | * | 9/1971 | Herrmann ................... 425/163 |
| 3,615,592 | A | | 10/1971 | Peterson |
| 3,679,338 | A | * | 7/1972 | Lutz ......................... 425/133.1 |
| 3,851,084 | A | | 11/1974 | Rossen et al. |
| 3,957,566 | A | | 5/1976 | Rahlfs |
| 4,116,369 | A | * | 9/1978 | Crowder .................. 222/145.3 |
| 4,125,585 | A | | 11/1978 | Rosenbaum |

(Continued)

FOREIGN PATENT DOCUMENTS

DE 3044535 6/1982

(Continued)

OTHER PUBLICATIONS

Chocolate, Cocoa, and Confectionery; Confectionery Processes and Formulations, pp. 582-593, no date.

(Continued)

*Primary Examiner*—Robert B Davis
(74) *Attorney, Agent, or Firm*—Bell, Boyd & Lloyd LLP (57) ABSTRACT

Center filled confections, such as gummy or jelly candies or fruit snacks are continuously produced by co-deposition into a mold without candy tailing to obtain products with substantially uniform side walls and little, if any, shell breakage and filler leakage or bleed-out problems. Decentering of the filler and its accompanying production of thin or weak shell walls is avoided by at least substantially preventing excessive flow of a fluid or liquid shell component along a single side of shell introduction into the manifold nozzle or nozzle cavity. At least substantially uniform flow of the shell component in an annular passageway of a co-deposition nozzle assembly may be achieved with an apertured disk insert, a plurality of manifold bores, or opposing shell component entry points to evenly distribute the shell component and prevent or substantially reduce filler leakage or bleed-out.

24 Claims, 6 Drawing Sheets

U.S. PATENT DOCUMENTS

| | | | |
|---|---|---|---|
| 4,185,954 A | | 1/1980 | Murakami et al. |
| 4,229,484 A | * | 10/1980 | Steels et al. .................. 426/279 |
| 4,364,882 A | | 12/1982 | Doucet |
| 4,517,205 A | * | 5/1985 | Aldrich ........................ 426/103 |
| 4,526,299 A | | 7/1985 | Vongeheur |
| 4,546,005 A | | 10/1985 | Vongeheur |
| 4,569,848 A | | 2/1986 | Giorgetti et al. |
| 4,579,744 A | | 4/1986 | Thulin et al. |
| 4,601,651 A | | 7/1986 | Vongeheur |
| 4,601,907 A | | 7/1986 | Knebl et al. |
| 4,630,533 A | | 12/1986 | Schaaf et al. |
| 4,674,968 A | | 6/1987 | Durst |
| 4,675,199 A | | 6/1987 | Hsu |
| 4,698,004 A | | 10/1987 | Ramnarine |
| 4,715,803 A | | 12/1987 | Koppa |
| 4,723,902 A | * | 2/1988 | Erickson ..................... 425/380 |
| 4,731,002 A | | 3/1988 | Spence et al. |
| 4,748,031 A | | 5/1988 | Koppa |
| 4,834,999 A | | 5/1989 | Matthews et al. |
| 4,846,648 A | | 7/1989 | Spence et al. |
| 4,847,098 A | | 7/1989 | Langler |
| 4,853,236 A | | 8/1989 | Langler |
| 4,888,192 A | | 12/1989 | Ramnarine |
| 4,925,380 A | | 5/1990 | Meisner |
| 4,975,288 A | | 12/1990 | Hager et al. |
| 5,019,404 A | * | 5/1991 | Meisner ....................... 426/249 |
| 5,094,603 A | * | 3/1992 | Gellert ........................ 425/130 |
| 5,125,819 A | | 6/1992 | Hager et al. |
| 5,146,844 A | | 9/1992 | Dubowik et al. |
| 5,180,602 A | | 1/1993 | Bainbridge et al. |
| 5,208,059 A | | 5/1993 | Dubowik et al. |
| 5,314,701 A | | 5/1994 | Mentink et al. |
| 5,318,417 A | | 6/1994 | Kopp et al. |
| 5,324,187 A | | 6/1994 | Cook |
| 5,626,892 A | | 5/1997 | Kehoe et al. |
| 5,626,896 A | | 5/1997 | Moore et al. |
| 5,686,128 A | | 11/1997 | Tracy et al. |
| 5,720,987 A | * | 2/1998 | Ploog ....................... 425/131.1 |
| 5,762,971 A | | 6/1998 | Schirmer |
| 5,955,116 A | | 9/1999 | Kehoe et al. |
| 6,000,926 A | | 12/1999 | Schirmer |
| 6,039,554 A | | 3/2000 | Akutagawa |
| 6,068,796 A | * | 5/2000 | Graham et al. .............. 264/1.28 |
| 6,109,006 A | | 8/2000 | Hutchinson |
| 6,135,751 A | * | 10/2000 | Gellert et al. ................ 425/130 |
| 6,200,125 B1 | | 3/2001 | Akutagawa |
| 6,277,420 B1 | | 8/2001 | Andersen et al. |
| 6,283,742 B1 | | 9/2001 | Akutagawa |
| 6,361,811 B2 | | 3/2002 | Akutagawa |
| 6,383,539 B1 | | 5/2002 | Akutagawa |
| 6,413,595 B1 | | 7/2002 | Schirmer |
| 6,432,460 B1 | | 8/2002 | Zietlow et al. |
| 6,485,771 B1 | | 11/2002 | Somerville et al. |
| 6,495,179 B1 | | 12/2002 | Zietlow et al. |
| 6,509,048 B2 | | 1/2003 | Akutagawa |
| 6,528,102 B1 | * | 3/2003 | Coyle et al. .................. 426/103 |
| 6,592,928 B2 | | 7/2003 | Makela et al. |
| 6,616,963 B1 | | 9/2003 | Zerby et al. |
| 6,620,448 B2 | | 9/2003 | Keller et al. |
| 6,623,784 B2 | | 9/2003 | Zerby et al. |
| 6,660,317 B1 | | 12/2003 | Akutagawa |
| 2002/0043740 A1 | | 4/2002 | Akutagawa |
| 2002/0058102 A1 | | 5/2002 | Makela et al. |
| 2002/0102333 A1 | | 8/2002 | Klug et al. |
| 2002/0153626 A1 | | 10/2002 | Manotas Dugant |
| 2002/0192345 A1 | | 12/2002 | Kepplinger et al. |
| 2003/0049360 A1 | | 3/2003 | Zietlow et al. |
| 2003/0077362 A1 | | 4/2003 | Panhorst et al. |
| 2003/0091700 A1 | | 5/2003 | Zietlow et al. |
| 2004/0185158 A1 | | 9/2004 | McHugh et al. |
| 2005/0260317 A1 | | 11/2005 | Cotten et al. |

FOREIGN PATENT DOCUMENTS

| | | |
|---|---|---|
| EP | 0 320 580 A2 | 6/1989 |
| EP | 0 320 580 A3 | 6/1989 |
| EP | 0 333 510 A2 | 9/1989 |
| EP | 0 333 510 B1 | 9/1989 |
| EP | 0 204 454 B1 | 10/1991 |
| EP | 0 322 952 B1 | 4/1992 |
| EP | 0 320 580 B1 | 7/1993 |
| EP | 0 783 840 A2 | 7/1997 |
| EP | 0 965 274 A1 | 12/1999 |
| EP | 0 968 656 A1 | 1/2000 |
| EP | 1 103 187 A1 | 5/2001 |
| GB | 2 185 931 | 8/1987 |
| JP | 60070036 | 4/1985 |
| JP | 1168243 | 6/1989 |
| JP | 2009346 | 1/1990 |
| JP | 6030707 | 2/1994 |
| JP | 63279758 | 11/1998 |
| WO | WO 00/38547 A1 | 7/2000 |
| WO | WO 00/64271 A1 | 11/2000 |
| WO | WO 02/071872 A2 | 9/2002 |
| WO | WO 03/043437 A1 | 5/2003 |

OTHER PUBLICATIONS

Chocolate, Cocoa, and Confectionery, Confectionery Processes and Formulations, pp. 520-529, no date.

Sugar Confectionery Manufacture, Gums and Jellies, pp. 198-211, no date.

Webster's Ninth New Collegiate Dictionary, p. 776, no date.

* cited by examiner

CONFECTION CENTER FILL APPARATUS AND METHOD

FIELD OF THE INVENTION

This invention relates to the production of center filled confections such as center filled jelly candy or gummy candy, and fruit snacks. This invention also relates to apparatus for producing center filled confections which are soft or chewy candies, or hard candies.

BACKGROUND OF THE INVENTION

In the mass production of center filled confections such as gummy candy, also known as jelly candy or fruit snacks using starch deposition equipment or methods, a low viscosity during deposition is desirable to avoid "candy tailing." The problem of candy tailing is a phenomenon where a string of product runs from one deposit to the next, thereby interlinking the desired individual sweets or pieces of confection. An additional problem in the production of center-filled products is an off-centered filling which results in a portion of the shell being thin and subject to breakage. A troublesome problem with off-centered product is that the pieces are more prone to leakage. Off-centered products tend to result in "leakers" or product in which the center or filler component leaks out of the shell or is exposed due to weakness or thin spots in the shell.

Excessively thin walls resulting from off-centered fillers may also limit the shapes into which the product can be molded, and may also limit the amount of filling because during deposition and molding, the generally cylindrical shape of the shell may be substantially changed. The change in shell shape for enrobing of the filler, and the change in shape to fill a mold cavity may further thin the shell walls.

The thinning problem may be further exacerbated when depositing into a mold cavity having a disproportionally longer vertical dimension or greater depth, than horizontal dimension, or width or vice versa (i.e., tall and slender or short and wide). For a given piece weight, when depositing into a cavity of these proportions there is less leeway for increasing the shell flow rate so as to create thicker shell side walls because the surface area of the piece (both shell and center) is much greater. To obtain thicker walls it may necessary to substantially reduce the amount of filler, thereby detracting from the sensation of a different texture or liquid center.

The leakage problem is of particular concern in the production of liquid or fluid filled confections. Leakage creates a sticky product and detracts from the liquid center sensation. The leakage may occur during material handling processes inherent in the manufacture of gummy or jelly sweets or fruit snacks. For example, leakage may occur after molding during oiling, polishing, and packaging operations as well as during transport and long term shelf storage in bags or pouches.

Another problem with off-centered products is that their appearance my be undesirable, even if the leaked filler is non-sticky. For example, for center filled products having a different colored or flavored center, the filler may be visible on the surface, or the different filler flavor may be tasted prematurely. Also, products having a transparent or translucent shell component and an off-centered filling may appear less attractive than a centered filler even if the filler has not leaked to the outer surface of the shell component.

Center filled confections are generally produced using commercially available Mogul or starch depositor equipment such as starch depositors manufactured by NID Pty. Ltd., Winkler and Dunnebier, and Werner Makat. In center fill manifold and nozzle combinations used for starch depositing, a center product or filler component runs down an inner tube down the center or middle of the manifold nozzle to near the extraction point of the nozzle. At this point it is surrounded by the shell component which has been flowing down the annular space in the nozzle between the nozzle outer wall and the inner tube. Generally, the manifolds are machined to have only one entry point for the shell component per cavity or nozzle.

However, it has been found that in the production of gummy or jelly candies or fruit snacks, as the shell portion is very fluid to avoid candy tailing, the shell component tends to preferentially flow down the side at which it was introduced into the annular space in the manifold. As a result, the center product is preferentially forced to the far side (side furthest away from the point of shell introduction in the manifold) in the stream emanating from the nozzle tip. This preferential flow of the shell component along the single side of introduction in the annular space and displacement of the filler by the shell component results in off-centered product. The loss in concentricity tends to be more pronounced when the viscosity of the filler component is substantially less than the viscosity of the shell component, such as in liquid center filled products.

U.S. Pat. No. 4,601,907 to Knebl et al discloses a chewy confection having an outer casing comprising chewing gum base and a sweetener, and a center filling which is an aerated plastic blend.

U.S. Pat. No. 4,674,968 to Durst discloses a molding apparatus for forming comestible shapes. A control means controls the flow of comestible into the mold cavity, the rotation of a scraper, and the opening and closing of a movable means for closing an open end of the mold to permit shaping of the comestible within the mold.

U.S. Pat. Nos. 4,847,098 and 4,853,236, European Patent Publication Nos. 333,510 A2, and 333,510 B1, and Japanese Patent Publication No. 2009346 published Jan. 12, 1990 each to Langler disclose dual textured food products comprising a portion of one texture and a second portion of a different texture that exhibits enhanced shelf life stability. The food products may be fruit snack pieces comprising a soft, supportive, fruit-containing shell portion and a second, more fluid, variably textured core portion. The shell portion can comprise a dehydrated fruit puree composition. In the products of U.S. Pat. No. 4,847,098 the core portion can comprise w/o emulsions characterized by low fat levels and defined gelled phases. In the products of U.S. Pat. No. 4,853,236 the core portion can comprise an o/w emulsion to create a hydrophobic, liquid fat barrier between the portions.

U.S. Pat. No. 4,925,380 to Durst discloses apparatus for manufacturing a multicolored aerated confection product utilizing individually adjustable multi-orifice extrusion systems.

U.S. Pat. No. 5,180,602 to Bainbridge et al discloses an apparatus for making confectionary or other shell goods by filling a mold with a desired media, such as molten chocolate, and then inverting the mold to drain the media from the mold while leaving the mold coated by a layer of the media, thereby forming a hollow shell inside the mold.

U.S. Pat. No. 5,626,896 to Moore et al discloses a method for making liquid-centered jelly candies by deposition in a starch mold to a level that half fills the mold. A small hard candy pellet is made from sugar, color, flavor, and acidulent. The hard candy pellet is centered on the jelly candy in each of the half full molds. A second deposit of warm jelly candy is filled over the pellets completing the candy pieces. The candy is cured at about 130° F. to about 140° F. for about 24-48 hours. During which time, moisture from the jelly candy migrates to and liquefies each candy pellet forming the liquid-centered jelly candy. The completed candy pieces are cured in the molds at about 130° F. to about 140° F. for about 24-48 hours. During the curing process, the moisture from the jelly migrates into and liquefies the sugar paste forming a liquid-centered jelly candy.

U.S. Pat. No. 6,495,179, U.S. Patent Publication No. 2003/0091700 A1, and International Patent Publication No. WO 00/64271 each to Zietlow et al disclose aerated confections in the form of pieces having a body color and a body exterior surface where at least a portion has been modified to provide an appearance disparate to the body. At least a portion of the external surface has a distinguishing feature differing from the body in color, texture or structure. Multi-colored marshmallows, it is disclosed, are conventionally made by dividing an aerated foam into a plurality of sub-streams, to admix a desired colorant into each sub-stream, and then extrude these colored sub-streams in substantially equal portions into a single rope or multiplicity of such ropes. In the Zietlow process a mass of aerated confection pieces having at least one colored portion and having an external surface at least a portion of which is sticky; have applied thereto particles of a coating at least a fraction of which have a second color to adhere the particles to the sticky portion of the surface. The coated aerated confection pieces are formed into finished non-sticky coated pieces.

U.S. Pat. No. 6,528,102 to Coyle et al discloses processes for the co-deposition of a two component fruit snack confection including a fruit snack material jacket and a distinct center filling. In at least one embodiment, the center filling is jam like and is jelled in part by the action of pectin in the presence of food grade acid. The process utilized incorporates mass flow meters to monitor the specific gravities of the jacket and center filling to keep the specific gravities of the center material and the jacket substantially the same and the creation of the multi-component fruit snack.

U.S. Patent Publication No. 2002/0058102 A1 and International Patent Publication No. WO 03/043437 A1 each to Makela et al disclose molding festooned, edible laminated structures that have at least one first fluid material of a sticky or flowable mass interleaved between thin layers of a second fluid material, wherein the first fluid material forms a pattern visible through the second fluid material, which has a visually translucent thickness.

U.S. Patent Publication No. 2002/010233 A1 to Klug et al discloses an edible confectionery product that has at least two parts. The first part is a base unit formed of a first confectionery and having a top, a bottom, and between five to twelve sides when viewed from above. The second part is a center inclusion formed of a second confectionery. The center inclusion is partially embedded in the base unit and extends above the top of the base unit. The center inclusion is set in, as viewed from the top, from any side of the base unit. The first confectionery has a different composition and preferably has a different texture than the second confectionery. In one embodiment, a plurality of base units are shearably joined.

U.S. Patent Publication No. 2002/0192345 A1 and International Patent Publication No. WO 02/071872 A2 each to Kepplinger et al disclose forming an aerated food component from a mixture of sweeteners, a fruit concentrate, an ionic hydrocolloid, a calcium source, an edible acid, a cation source, and a whipping protein. The aerated food component can be extruded, cut into pieces and dried to form a low moisture aerated cereal additive that remains crisp in a liquid. The formulation also permits high levels of fruit to be incorporated into the aerated food component.

U.S. Patent Publication No. 2003/0077362 A1 to Panhorst discloses a candy product which is prepared using as a flavor component a flavorant particle which comprises a hydrophilic flavor encapsulated within a water soluble shell. The candy may be a hard candy, chewy candy, a gummy or jelly candy, a paste lozenge, tablet licorice, or a pan coated candy.

European Patent Publication No. EPO 0322952 B1 discloses an aerated confection comprising ice confection or chilled mousse-like material and an aerated fat-based glaze material. The glaze material may be a slab or a bar arranged as a core in the confection, or as a plug or relatively big lump in the body of the confection. Apparatus and dispensing device for manufacturing such aerated confection, may include a recirculation conduit which is axially movable within a dispensing conduit.

U.S. Pat. Nos. 4,715,803 and 4,748,031 to Koppa disclose an extruder which provides a triple coextruded product having an inner layer, which is surrounded, or enrobed, by an intermediate layer, which is surrounded, or enrobed, by a third outer-most layer. The inner layer is a dough having a chewy and moist texture when baked and the outer layer is a dough having a crispy texture after baking. These patents relate specifically to the introduction of a barrier material between the two dough layers in order to achieve the desired product stability and shelf life. The moisture barrier is injected through the outer cylindrical layer in a tube upstream of the extruder outlet.

A pillow-shaped product, having an outer layer of expanded dough and two different filler materials is disclosed in U.S. Pat. Nos. 4,698,004 and 4,888,192 to Ramnarine. The penetration of the outer expansible dough by the inner fillers in the end product is avoided through the use of a nozzle which can be adjusted to compensate for the effects of the fluid flow of the individual streams. The process is directed to the side-by-side extrusion of the filler materials.

U.S. Pat. No. 3,241,503 to Schafer discloses a die for the manufacture of cookies with concentric rings of different colored dough. The process involves introducing successive layers of dough through conduits perpendicular to the die into annular cavities surrounding a longitudinally extending bore.

U.S. Pat. No. 4,834,999 to Matthews et al discloses triple coextruding a meat-based product comprising whole muscle body surrounding a core stuffing, an outer casing, and an annular layer of fat between the whole-muscle body and the outer casing.

U.S. Pat. No. 5,686,128 to Tracey et al discloses the production of a triple coextruded snack having a casing material which may be a dough or an expansible dough such as a cookie dough, or cracker dough enrobing two fillers. The triple coextrusion apparatus includes a unitary die block for all three materials and has smooth and uninterrupted flow paths. A small diameter extrudate rope is produced with a central filler enrobed by an outer filler, subsequently enrobed by an outer casing formed from multiple streams. The outer casing material streams reform into an integral concentric layer having no or substantially no seam lines or striations in the outer casing. The extrudate ropes may be sufficiently small in diameter, even when the casing is expanded, to allow feeding into a candy machine for shaping by molding or crimping to produce small diameter snack products without substantial waste or scrap material.

Japanese Patent Publication No. 60-070036, published Apr. 20, 1985, discloses production of three-layered soft food by extruding a core layer, interlayer, and outer layer at the same time to mold a three-layered cylindrical material, rolling the material while cut into a given size using a cutting and rolling means, and molding the material.

Coextrusion is also used to manufacture multi-layered plastic articles. For example, U.S. Pat. No. 4,185,954 to Murakami, et al., U.S. Pat. No. 5,318,417 to Kopp, et al., and U.S. Pat. No. 5,324,187 to Cook describe apparatus and processes for manufacturing multilayered tubular or hollow plastic products where each outer layer is successively added downstream to surround the upstream added inner material or materials.

U.S. Pat. No. 4,125,585 to Rosenbaum, U.S. Pat. No. 4,731,002 to Spence, et al., and U.S. Pat. No. 4,846,648 to Spence, et al. describe method and apparatus for manufacturing multilayered plastic pipe where the inner layer is injected across the central layer and through a spider.

U.S. Pat. No. 4,364,882 to Doucet describes method and apparatus for manufacturing multilayered plastic pipe where the central layer is injected across the outer layer through a trefoil.

German patent DT 3044535 (published Jun. 24, 1982) describes a method and apparatus for manufacturing multi-layered plastic pipe where one or two central layers are injected across the outer layer.

As to apparatus for the production of center-filled confections, Japanese Patent Publication No. 6030707 to Hidenari et al, assigned to Kanebo Ltd., and published on Feb. 8, 1994 discloses apparatus for continuously producing a centered confectionery capable of always filling a center at a constant ratio or a constant amount of a filled center such as chewing gum or candy. A concentrically arranged double-pipe nozzle is installed in the tip of an extruder and an annular nozzle of the double-pipe nozzle communicates with a discharge outlet of the extruder. The central nozzle part communicates with a discharge outlet of a pump for a center. A rope sizer for drawing and forming a discharged ropy gum, a moisture meter for sensing the moisture content thereof and a stamping molding machine for stamping the gum into a granular shape are connectedly installed along the downstream side of the outlet of the extruder.

U.S. Pat. No. 4,526,299 to Vongeheur discloses a process and apparatus for pouring confectionery solution. The apparatus includes a supply tank heated to approximately 80° C., a dosing system, a nozzle plate and heating means. The proportion of the confectionery solution which is branched off from the supply tank for a pouring operation receives heat as it passes through the dosing system and/or the nozzle plate.

U.S. Pat. Nos. 4,546,005 and 4,601,651 each to Vongeheur disclose a confectionery solution containing gelling agents such as agar-agar, tends very markedly to form streamers or tails when being poured. The formation of tails or streamers is inhibited by the atmosphere in the environment of the pouring region being maintained at (a) a temperature at least equal to the temperature of the confectionery solution and (b) a moisture content at least equal to the equilibrium moisture of the confectionery solution.

U.S. Pat. No. 4,630,533 to Schaaf discloses a cooking extruder in which the nozzle head is disposed in a nozzle plate and the passage through which the material for the envelope body is supplied extends at an angle to the axis of a filling tube through which the filling material is introduced into the extruded envelope body. When clogging occurs during production the filling tube can be withdrawn from the nozzle head and replaced by a new filling tube. The front end of the filling tube is led between forming rolls and serves as an abutment for the rolls. This makes it possible to form the surface of the envelope body with a pattern or bake the surface locally or over the entire periphery. In the nozzle head a baffle plate is disposed with the aid of which a uniform distribution of the material supplied for the envelope body may be achieved. An annular space between a lining tube in a hollow mandrel and the filling tube may be subjected to suction extraction.

U.S. Pat. Nos. 4,975,288 and 5,125,819, European Patent Publications Nos. 320,580 A2, 320,580 A3, and 320,580 B1, and Japanese Patent No. 1168243 each to Hager et al disclose an apparatus for making center-filled chewing gum, in which product having up to at least 35-40% by weight of center fill can be produced. The apparatus includes an extruder barrel and nozzle arrangement which extrudes a tubular rope of gum through an annular orifice, and at the same time supplies a center-fill material to the hollow interior of the tubular rope through a central nozzle concentric with the orifice.

U.S. Pat. Nos. 6,039,554 and 6,283,742, U.S. Patent Publication No. 2002/0043740/A1, and European Patent Publication No. 0 783 840 each to Akutagawa disclose a molding system for use in producing a solidified article having a predetermined composite pattern formed of at least two kinds of viscous fluids distinct from each other in color. The system includes at least one discrete passage per each of the viscous fluids, and at least one discrete passage outlet per each of the viscous fluids separately guided through the at least one discrete passage.

U.S. Pat. No. 6,383,539 and European Patent Publication No. 0 968 656 A1 each to Akutagawa disclose a nozzle assembly branching each stream of at least two fluidized food materials of different colors into multiple streams, and guiding the multiple streams to predetermined locations in a mold. The nozzle assembly includes an upper nozzle plate, at least one lower nozzle plate positioned below and in contact with the upper nozzle plate, each of the upper and lower nozzle plates having at least two discrete passages, each of the passages in the upper nozzle plate guiding one of the food materials in a substantially horizontal direction, and having at least one communication port each in communication with corresponding one of the passages in the lower nozzle plate, each of the passages in the lower nozzle plate having at least one discharge port for discharging one of the food materials into one of the one or more unit cavities, at least one of the passages in the lower nozzle plate being a horizontal guide passage for guiding one of the food materials in a substantially horizontal direction.

U.S. Pat. Nos. 6,200,125, 6,361,811 and 6,509,048, and European Patent Publication No. 0 965 274 A1 each to Akutagawa disclose a decorative food formed of a plurality of kinds of fluid food materials and manufactured by using a mold. The decorative food has an outside shape thereof conforming to an interior surface of the mold inclusive of an opening of the mold. The decorative food has a colored pattern divided into multiple divisions extending up to a central portion of the decorative food, in a direction to extrude the food materials into the mold, the colored pattern being formed such that the multiple divisions are arranged with substantially the same ratio at any of a cross sectional area intersecting the direction to extrude the food materials, and wherein the decorative food contains therein a foodstuff.

U.S. Pat. No. 6,620,448 to Keller et al discloses an extruder die assembly which is inserted into an appropriate compartment within an extrusion device such that a first extrudate is directed down a coaxially aligned passageway within the forming section and combined with a fluid additive in the injection section whereupon the resulting food mass is compressed through a converging nozzle bore in the nozzle section to produce an extruded food product. The forming section and the injection section, when properly aligned and coupled form an internal peripheral reservoir manifold through which a fluid additive may be supplied to at least one and more preferably a plurality of capillary channels which in turn impart a distinct cross-sectional design into a flowing mass of a first extrudate.

U.S. Pat. No. 6,660,317 and European Patent Publication No. 1 103 187 A1 each to Akutagawa disclose a method for producing patterned compound food products by: (A) pouring predetermined amounts of at least two kinds of fluid food materials of different colors for forming the outer section into a cavity of a mold to obtain a preshaped product in a substantially fluid state held in the cavity shape; (B) inserting a nozzle into the preshaped product; ©) injecting a predetermined amount of fluid filling material for forming the inner section through the nozzle into the preshaped product; (D) drawing the nozzle out of the preshaped product; and (E) solidifying, after (D), at least the fluid food materials in the cavity.

The present invention provides a method and apparatus which solve both candy stringing and filler leakage or bleed-out problems in producing starch deposited, center filled confections, such as gummy candy, jelly candy, and fruit snacks. In accordance with the present invention, low viscosity shell and filler components may be employed to avoid candy stringing without substantial decentering of the filler. Center-filled confections obtained using the methods and apparatus of the present invention have substantially uniformly thick walls, and are durable during material handling processes employed after deposition and molding such as oiling, polishing, and packaging. The products exhibit long term shelf life in bags or pouches without substantial leaking or bleed-out of filler, are non-sticky, have a desirable appearance, even when the shell is translucent or transparent thereby making the filler component visible through the shell. The products contain a high weight percentage of filler and may be produced in mold cavities having a greater depth than width without resulting in weak, leaky shell side walls.

The apparatus and methods of the present invention at least substantially prevent excessive flow of shell component along the side of shell introduction into the manifold nozzle or cavity thereby avoiding decentering of the filler. In embodiments of the invention, known or commercially available Moguls or starch depositors having a single entry for the shell component may be retrofitted with a nozzle insert to evenly distribute the shell component. In other embodiments of the present invention, a manifold design which provides more even distribution or flow of the shell component through the nozzle annulus is provided.

SUMMARY OF THE INVENTION

Center filled confections such as gummy candies, jelly candies, and fruit snacks, as well as hard candies may be produced using Mogul or starch deposition techniques and equipment in accordance with the methods and apparatus of the present invention. The confections are produced with well-centered fillings, high filler amounts, and thick substantially uniform walls which do not exhibit substantial, if any leakage or bleed-out. Low viscosity shell and filler components which are highly fluid may be employed so as to avoid candy tailing in the deposition process and to obtain liquid centers without substantial decentering of the filler. Leaky products are avoided by distributing the shell component at least substantially evenly throughout an annular passageway of each manifold nozzle prior to contact of the filler component and the shell component so that the filler component is at least substantially centered within the shell component when the filler and shell components are contacted. Relatively high liquid filler component contents may be consistently achieved without substantial, if any leakage or bleed-out problems. Exemplary liquid filler component contents may be from about 20% by weight to about 25% by weight, or more, based upon the total weight of the shell and filler components.

In embodiments of the invention even distribution of the shell component in a manifold nozzle involves preventing excessive flow along a side or portion of the annular passageway which is at or adjacent to a single entry point of the shell component into the annular passageway. In retrofitting such apparatus a removable, apertured disk insert may be employed to divert flow of the shell component away from the side or portion of the annular passageway where the single entry point of the shell component is located toward an opposing side or portion of the annular passageway. As a result, excessive flow of the shell component which tends to push or redirect the filler component towards an opposing side or portion of the annular passageway and create substantially non-concentric center filled confections is avoided.

The insert may include a mechanical locating device or member to locate or align and lock down the insert to a position where the shell component enters the manifold cavity or annular passageway. Alternatively, the insert could have a notch or notches and the corresponding center tube may have a key way type notch or a series of notches or cogs such that it can be positioned and locked in place. The insert has a series of holes or apertures to balance the flow of the shell component down the annular passageway of the nozzle when the insert is located or locked in the proper location with respect to the single entry point.

In preferred embodiments, the total cross-sectional area of the flow distributing apertures of the insert is greater than or substantially equal to the cross sectional area of the shell component entry point so as to at least substantially maintain a constant mass flow rate of the shell component and avoid a substantial increase in back-pressure in feeding of the shell component through the annular passageway.

For non-retrofitted apparatus, the flow distributing apertures may be drilled or bored into a downstream manifold plate rather than being provided in a removable insert disk. The bores may be generally parallel to the central longitudinal axis of the manifold nozzle and be located away from the single entry point into the annular passageway. As in the embodiment where an apertured disk insert is employed, the flow distributing manifold bores may be located to divert flow of the shell component away from the side or portion of the annular passageway where the single entry point of the shell component is located toward an opposing side or portion of the annular passageway.

In other non-retrofitted or non-disk insert embodiments of the invention, even distribution of the shell component in a manifold nozzle involves feeding the shell component at least substantially evenly through at least two substantially opposing entry points into the annular passageway of each manifold nozzle so that the opposing flows from the entry points maintain the flow of the filler component at least substantially along a central longitudinal axis and create substantially concentric center filled confections. The manifold is constructed so that the multiple passageways for feeding the shell component to the plurality of entry points for each annular passageway have at least substantially the same resistance to flow or at least substantially the same path lengths.

DETAILED DESCRIPTION OF THE INVENTION

The present invention provides a method and apparatus for producing center filled confections, such as gummy or jelly candies or fruit snacks, which are substantially less prone to breakage and filler leakage or bleed-out problems than products produced using conventional Mogul or starch depositors having a single, side entry point for the shell component. Decentering of the filler and its accompanying production of thin or weak shell walls is avoided by at least substantially preventing excessive flow of a fluid or liquid shell component along a single side of shell introduction into the manifold nozzle or cavity. Flow diverting apertures are employed to divert flow of the shell component away from the side or portion of an annular passageway where the entry point of the shell component is located toward an opposing side or portion of the annular passageway. Commercially available Moguls or starch depositors having a single entry for the shell component may be retrofit with an apertured insert to evenly distribute the shell component and prevent or substantially reduce filler leakage or bleed-out in accordance with the methods and apparatus of the present invention. In other embodiments of the present invention, starch deposition equipment may be provided with a manifold having opposing entry points or having a plurality of bores which provide more even distribution or flow of the shell component through the nozzle annulus and prevent or substantially reduce filler leakage or bleed-out.

Commercially available Moguls or starch depositors for dispensing the shell and filler components into a mold generally include one or more coextrusion nozzles or die blocks secured to a die head or manifold. Known manufacturers of such center and shell depositor type equipment include Werner Makat GmbH, NID Pty, Ltd., Winkler Dunnebier GmbH, American Chocolate Mould Co., Buehler, BEEPEX, Baker, APV and AMP. Such equipment may be modified or retrofitted in accordance with the present invention as schematically shown in FIG. 1.

Figure 1:
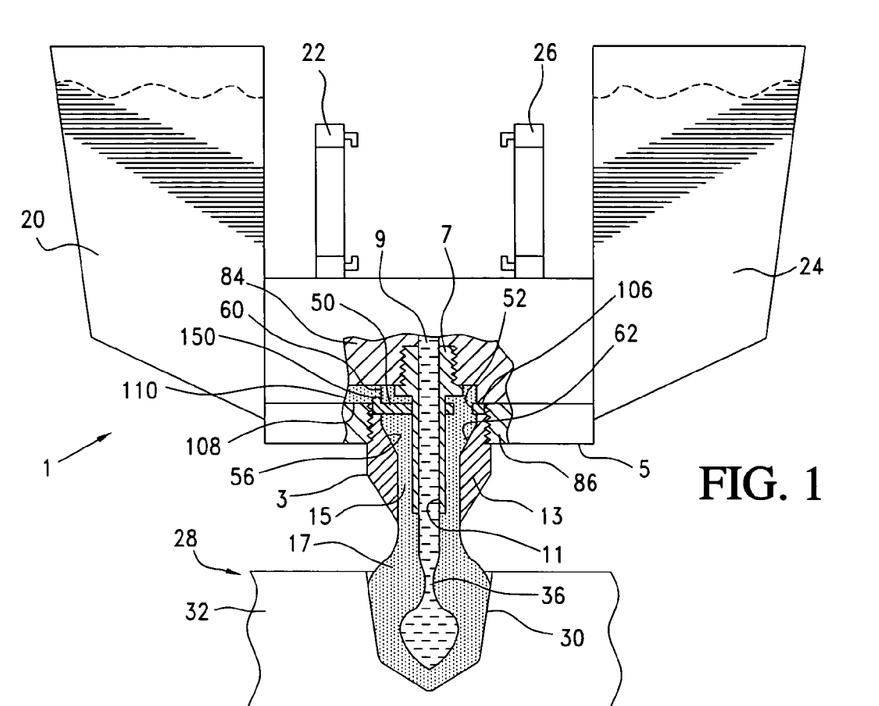
FIG. 1 shows an apparatus for the production of a center filled confection using a flow distributing disk insert in accordance with the present invention with a partial cross-sectional view of a nozzle assembly as a shell component partially enrobes a filling component as the confection is being formed in a starch impression confection mold.

As shown in FIG. 1, starch deposition apparatus 1 which may be employed in the present invention for continuously producing center filled confections, such as a gummy or jelly candies or fruit snacks may include at least one die block or nozzle assembly 3 contained in a die head or manifold 5. The nozzle assembly 3 has an inner nozzle 7 which conveys a center or filler component 9 through an inner passageway 11. The inner nozzle 7 is located within an outer nozzle 13 which creates an annular passageway 15 for conveyance of a shell component 17. The shell component 17 may be supplied to the outer nozzle 13 from a shell component hopper 20. The outer nozzle 13 may also be in flow communication with an outer or shell component piston 22 which moves between a first and a second position to deposit the shell component 17.

The center or filler component 9 may be supplied to the inner nozzle 7 from a filler component hopper 24. The inner nozzle 7 may also be in flow communication with an inner or filler component piston 26, which moves between a first and a second position to deposit the center or filler component 9. The shell component 17 and the filler component 9 are codeposited in a mold 28 having mold cavities or impressions 30. The cavities or impressions 30 may be created in a starch-based material 32 which is to be filled with the codeposit of shell and filler components. In the production of gummy or jelly candies, or fruit snacks a starch mold is generally preferred due to its flexibility in enabling changing shapes easily and removing additional moisture from the product in the curing room through a wicking type action. However, semi-rigid molds or flexible molds such as silicone rubber molds, or rigid molds such as molds cast of metal, as used in hard candy production may also be employed for varying confections.

The pistons 22, 26 may be controlled in conventional manner to enrobe the filler component 9 within the shell component 17 by pulsating or controlling the relative flow rates of the shell and filler components 17, 9 with the pistons 22 and 26, respectively. The pistons 22, 26 may be employed to stop, retract or reverse, decrease, or increase flow of the components emanating from the outer and inner nozzles 13 and 7, respectively as they are deposited into the mold impressions or cavities 30.

Figure 2:
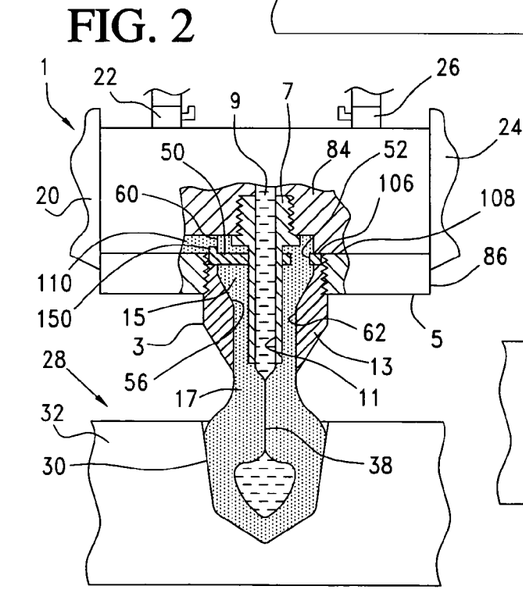
FIG. 2 shows the apparatus of FIG. 2 with the filler component further enrobed in the shell component and the filler component which is deposited in the mold almost completely separated from the filling component still within the inner nozzle.

For example, as shown in FIGS. 1 and 2 the depositing nozzle 3 may be positioned close to the mold cavity 30. The shell component 17 flows into the cavity 30 first. Subsequently, the filler component 9 begins to be deposited. The shell component 17 may then spread laterally within the cavity 30 to take the shape of the cavity 30 in the starch material 32 while the filling material 9 is still being injected. As shown in FIG. 1 the filling component 9 is partially enrobed in the shell component 17. In FIG. 1 the center or filler component 9 is no longer being injected and the filling piston 26 is being reversed to reverse the flow or suck back the filler component 9. However, in FIG. 1 the shell component 17 continues to be deposited and causes the deposited, partially enrobed filling component 9 to begin to separate from the filling component still within the inner nozzle 7 as shown in FIG. 2. The filling component 9 connecting the deposited center filling to the center filling still within the inner nozzle 7 narrows first to a neck 36 as shown in FIG. 1 and then to a finer connection 38 as shown in FIG. 2.

Figure 3:
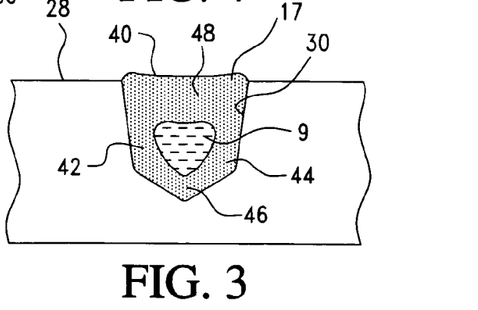
FIG. 3 shows the starch mold of FIGS. 1 and 2 with a center filled confection having the deposited filler component completely enrobed in the deposited shell component, and at least substantially uniformly thick side walls essentially devoid of weak spots.

Finally, as shown in FIG. 3 the depositing of both the center filling component 9 and the shell component 17 is stopped, and the starch tray or mold 28 and the starch cavity or impression 30 is moved away from the deposition nozzle to completely enrobe the filler component 9 within the shell component 17. As shown in FIG. 3 a center filled confection 40, such as a gummy or jelly candy or fruit snack is obtained with the filling 9 at least substantially centered within the shell component 17. The center-filled confections of the present invention, as shown in FIG. 3 have shell component walls 42, 44, 46, 48 which are each at least substantially uniformly thick and essentially devoid of thin or weak spots, and completely enrobe the filler component 9. The longitudinal axis of the center filling 9 is at least substantially the same as the longitudinal axis of the shell component 17 and the longitudinal axis of the entire confection 40.

In embodiments of the invention, where the specific gravity of the center filling is less than or greater than the specific gravity of the shell component, the center filling may tend to migrate upwards or downwards, respectively in the confection. Differences in specific gravity may occur during deposition, during cooling or in the cooled, finished product. The migration tends to occur prior to or during setting of the fillers. Upward and downward filler migration tendencies resulting from different specific gravities may be compensated for by use of the pistons to increase or decrease relative flows of the components so as to create a top wall which is thicker than the bottom wall, or vice versa. The ability to use deeper mold cavities or impressions for a given confection piece weight thus may provide greater latitude in creating thicker top or bottom walls to compensate for any migration of the center filler due to substantial differences in specific gravities of the two components.

Thus, in embodiments of the present invention, where for example the specific gravities of the two components are substantially different, the center-filled confections 40 may have a shell casing 17 with a substantially thicker top wall 48 than bottom wall 46 as shown in FIG. 3 or vice versa. However, each of the bottom and top walls 46, 48 will each still have an at least substantially uniform thickness devoid of weak spots. Additionally, each of the shell side walls 42, 44 will have an least substantially uniform thickness devoid of weak spots along their length. Also, the thickness of each of the side walls 42, 44 are at least substantially equal to each other.

In accordance with the present invention, and as shown in FIGS. 1 and 2, the shell component 17 is distributed substantially uniformly in the annular passageway 15 of the nozzle assembly 3 of a Mogul or starch depositor 1 by use of an apertured disk insert 50. The flow distributing apertures 52 in the insert disk 50 at least substantially evenly distribute the shell component 17 within the annular passageway 15 before the shell component 17 contacts and partially enrobes the filler component 9 which is fed through the inner passageway 11 of the inner nozzle 7 as shown in FIGS. 1 and 2.

Use of an insert disk 50 in accordance with embodiments of the present invention avoids excessive flow of the shell component 17 down the side 56 of the annular passageway 15 where the sole shell entry point 60 is located. The excessive flow tends to push or redirect the filler component 9 emanating or exiting the inner nozzle 7 towards an opposing side or portion 62 of the annular passageway 15 and create substantially non-concentric center filled confections. Prevention of the excessive flow on one side of the annular passageway avoids the undesirable production of substantially off-centered product 66 such as shown in FIG. 4.

Figure 4:
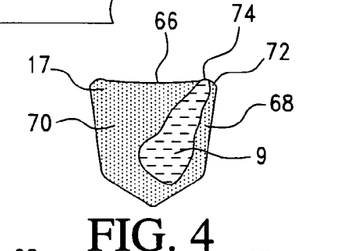
FIG. 4 shows a substantially off-centered product with uneven shell side walls prone to filler leakage or bleed-out as produced on starch deposition apparatus which does not have a plurality of flow distributing apertures for the shell component.

Undesirable, substantially off-centered product 66, as shown in FIG. 4 has substantially uneven side walls 68, 70, with substantially thin portions 72 which are prone to breakage and leakage or bleed-out of filler 9 through the shell component 17 to the surface 74 of the product 66. In addition, the filler component 9 shape may be substantially non-uniform and distorted as shown in FIG. 4.

Figure 5:
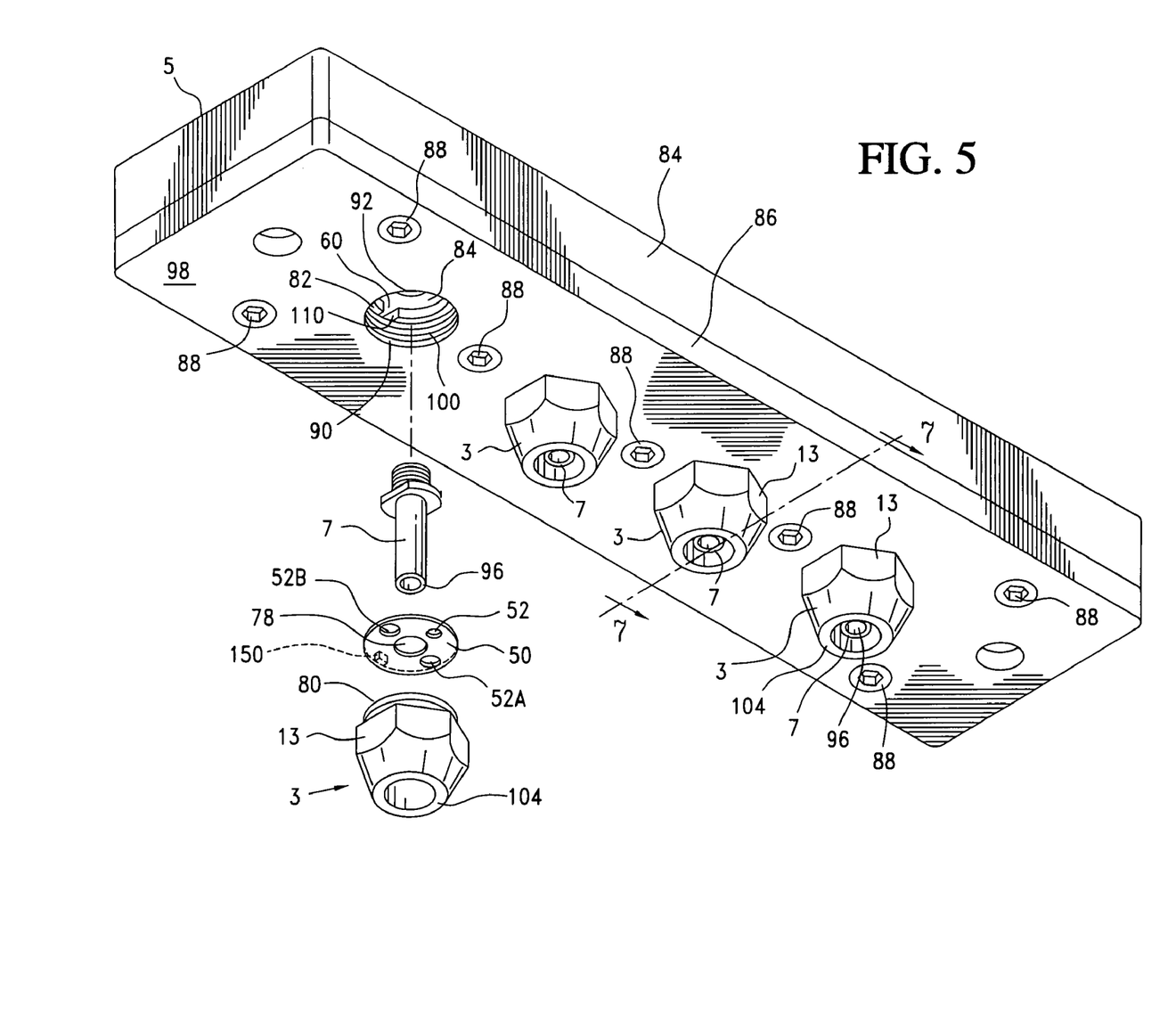
FIG. 5 is a perspective view of a starch deposition manifold with a plurality of nozzle assemblies which may be used in the apparatus of FIG. 1 showing an exploded view of a nozzle assembly having a flow distributing disk insert in accordance with the present invention.
Figure 6:
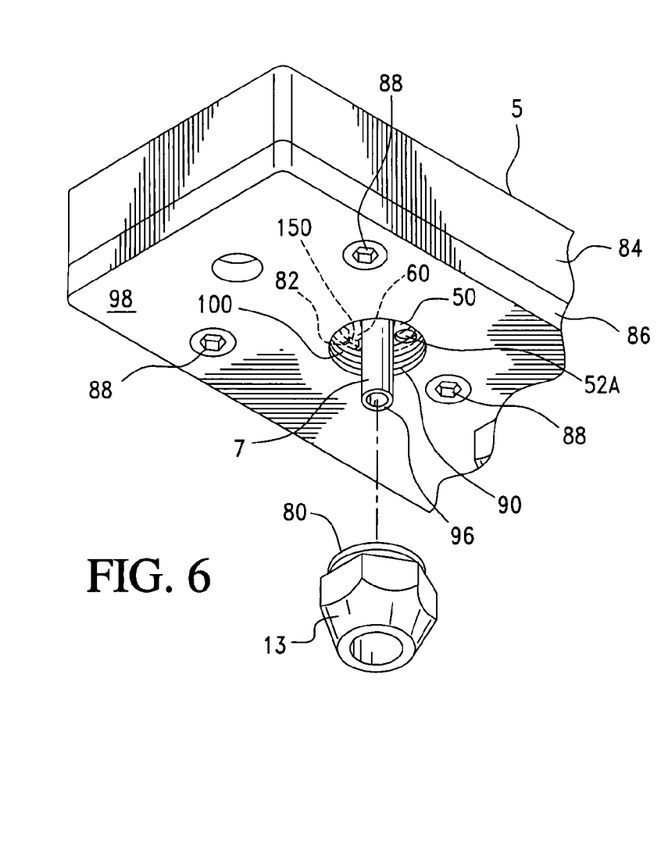
FIG. 6 is a perspective partial view of the manifold and nozzle assembly of FIG. 5 showing a partially exploded view of the nozzle assembly after the disk insert is inserted in the manifold.
Figure 7:
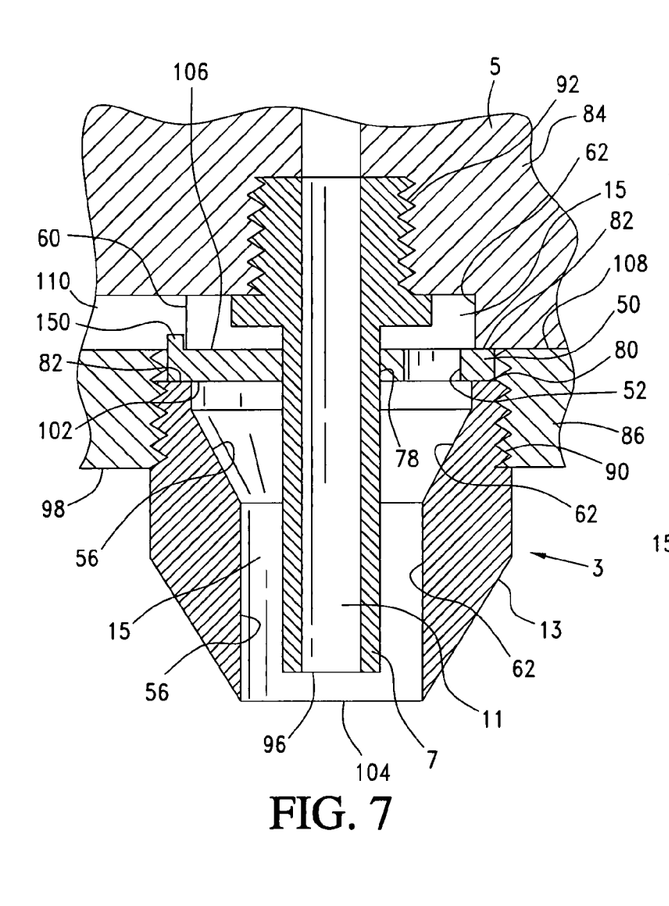
FIG. 7 is partial cross sectional view of the manifold and nozzle assembly of FIG. 5 along line 7-7 showing the apertured disk insert in accordance with the present invention.

As illustrated in FIGS. 5, 6, and 7 the apertured disk insert 50 may be readily, removably inserted onto the inner nozzle 7 so that the inner nozzle 7 and its inner passageway 11 extend through a central aperture 78 of the disk insert 50. The disk insert 50 is held in place between the upstream end 80 of the outer nozzle 13 and a land or ridge 82 in the die head or manifold 5. As shown in FIGS. 1, 2, 5, 6, 7, and 8 the die head or manifold 5 may be a split manifold, having an upstream plate or section 84 and a downstream plate or section 86, with the land or ridge 82 being a part of the upstream section 84.

Figure 8:
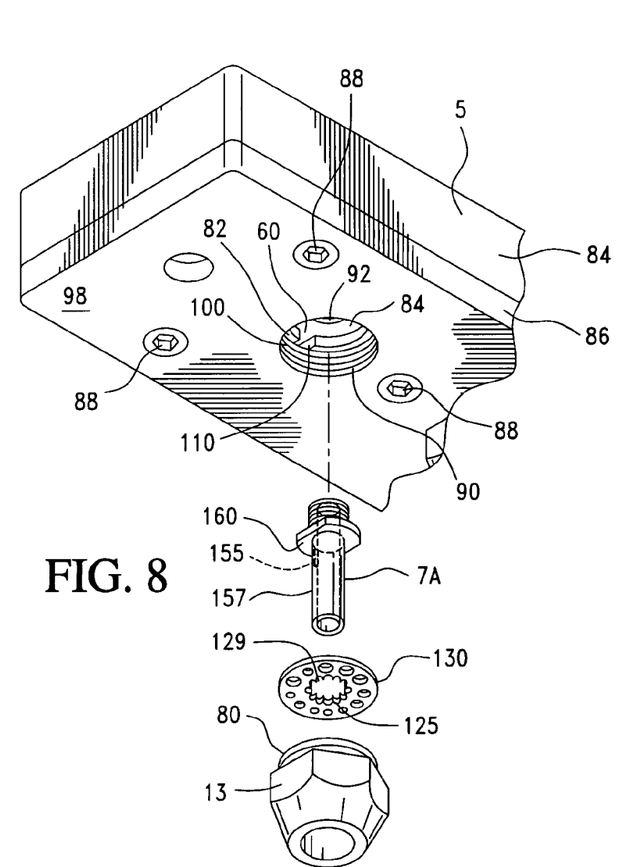
FIG. 8 is a perspective view of a starch deposition manifold with a plurality of nozzle assemblies showing an exploded view of a nozzle assembly having another embodiment of a flow distributing disk insert and corresponding inner nozzle in accordance with the present invention.

The downstream manifold section 86 may be fastened with bolts 88 or other known fastening devices to the upstream section 84 as shown in FIGS. 5, 6, and 8. As illustrated in FIGS. 5, 6, 7, and 8 the die head or manifold 5 may have a plurality of nozzle assemblies 3 secured to the manifold 5 by screw threads 90, 92. The inner nozzle 7 may first be screwed into the upstream manifold section 84 so that it is secured in place with its exit tip 96 extending beyond the outer face 98 of the downstream manifold section 86. As shown in FIGS. 5, 6, 7, and 8, then an apertured disk insert 50 of the present invention may be inserted onto the inner nozzle 7, and into the manifold's nozzle cavity 100 so that the insert rests on the land or ridge 82. After the insert 50 is properly positioned within the nozzle cavity 100, the outer nozzle 13 may then be screwed into the downstream manifold section 86 to butt up against the upstream end or side 102 of the insert 50 and to secure it against longitudinal movement along the inner nozzle 7 as illustrated in FIG. 7.

The exit tip 104 of the outer nozzle 13 extends beyond the exit tip 96 of the inner nozzle 7 as shown in FIGS. 1, 2, 5, and 7. The extension permits contacting and partial enrobing of the filler component by the shell component within the nozzle assembly 3 at and downstream of the terminus or exit tip 96 of the inner nozzle 7.

As illustrated in FIGS. 1, 2, and 7 the upstream planar surface 106 of the apertured disk may be located at the interface 108 of the upstream and downstream manifold sections 84, 86. The shell component 17 may be supplied to the die head or manifold 5 through a shell component feed passageway 110 which terminates at the shell component single entry point 60 in the annular passageway 15 as shown in FIGS. 1, 2, 5, 7, and 8. The single shell component entry point 60 is located upstream of the upstream planar surface 106 of the apertured disk 50. The shell component feed passageway 110 may be a groove on the downstream surface of the upstream manifold section 84, so that the passageway 110 and the shell component entry point 60 are at the interface 108 of the upstream and downstream manifold sections 84, 86. As shown in FIG. 7, the flow distributing apertures 52 of the disk insert 50 may be in the annular passageway 15 at or downstream of the interface 108 and even with or downstream of the shell component entry point 60.

Figure 9:
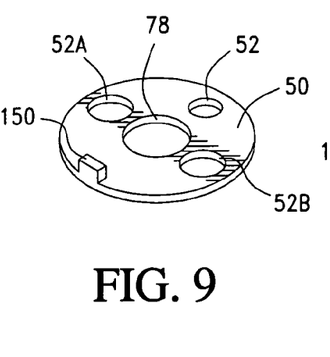
FIG. 9 is a top perspective view of the flow distributing disk insert shown in FIGS. 1, 2, 5 6, and 7.
Figures 10, 12:
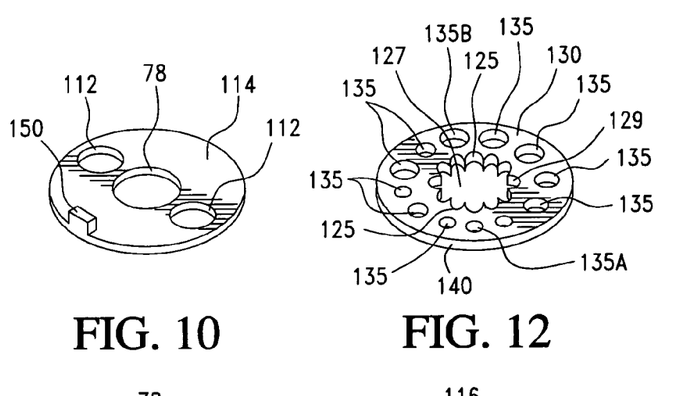
FIG. 10 is a top perspective view of another embodiment of a flow distributing disk insert which may be employed with the manifold and nozzle assemblies of FIG. 5 in accordance with the present invention.
FIG. 12 is a top perspective view of the flow distributing disk insert shown in FIG. 8.
Figure 11:
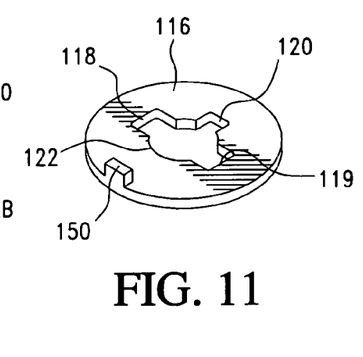
FIG. 11 is a top perspective view of another embodiment of a flow distributing disk insert which may be employed with the manifold and nozzle assemblies of FIG. 5 in accordance with the present invention.

The apertured insert disk 50, as shown in FIGS. 1, 2, and 7 blocks, obstructs, restricts or impedes the flow of the shell component 17 down the annular passageway 15 from the entry point 60, and diverts and distributes the flow across the upstream face or surface 106 of the insert 50 towards the opposing side 62 of the annular passageway 15 and into and through the apertures 52 of the disk insert 50. The apertures may differ in size and may be placed at only a few locations on the disk as shown in FIGS. 9, 10, and 11 or in locations completely around the disk as shown in FIG. 12 to provide at least substantially uniform flow through the annular passageway downstream of the insert.

In the embodiment of FIGS. 1, 2, 5, 6, 7, and 9, the insert disk 50 contains three apertures 52, 52A, 52B. Two apertures 52A, 52B of about equal size are placed diametrically opposite each other in the disk 50. A third, smaller aperture 52 is located at about 90° from the two other apertures 52A, 52B. The disk 50 is inserted so that the third, smaller aperture 52 is about diametrically opposite the entry point 60 of the shell component 17, as shown in FIGS. 1, 2, 5, and 7. The disk 50 is located in the nozzle assembly 3 so that the two diametrically opposed apertures 52A, 52B are about equally spaced from the shell entry point 60.

Generally, as the viscosity of the shell component decreases, there is a greater tendency for the shell component to flow down the side of the annular passageway which is closer to the entry point of the shell. Accordingly, to more evenly distribute the shell component, more apertures may be needed as the shell viscosity decreases. In the embodiment of FIG. 10, only two equally sized, large apertures 112 are employed and they are placed diametrically opposite of each other on the disk 114. The disk 114 of FIG. 10 may be employed for higher viscosity shell components than used with the disk 50 of FIG. 9. The two-holed disk 114 of FIG. 10 may be placed in the annular passageway 15 so that the two apertures 112 are about equally spaced from the shell component entry point 60.

In embodiments of the present invention, the central aperture of the disk insert may also serve to provide flow distributing apertures. In such embodiments, the central aperture of the disk may have a plurality of scallops or notches, or portions, or extensions with diameters substantially greater or beyond the outer diameter of the inner or filler nozzle. In these embodiments the central aperture and the flow distributing apertures form a single aperture, and insertion of the insert on the inner nozzle creates separate flow distributing apertures.

For example, in the embodiment of FIG. 11, the insert disk 116 contains three flow distributing apertures 118, 119, 120 contiguous with the central aperture 122. Two notches or apertures 118, 119 of about equal size are placed diametrically opposite each other in the disk 116. A third, smaller flow distributing aperture 120 is located at about 90° from the two other apertures 118, 119. The disk 116 is inserted on the inner nozzle 7 so that the third, smaller aperture 120 is about diametrically opposite the entry point 60 of the shell component. The disk 116 is located in the nozzle assembly 3 so that the two diametrically opposed apertures 118, 119 are about equally spaced from the shell entry point 60.

In the embodiment of FIG. 12, about equally sized scallops, notches, or flow distributing apertures 125, contiguous with the central aperture 127, are located completely around the inner periphery 129 of the disk insert 130. Additional, separate flow distributing apertures 135, 135A, 135B are located completely around the insert 130 between the scallops 125 and the outer periphery 140 of the disk 130. The smallest and the largest separate apertures 135A and 135B, respectively, may be diametrically opposite each other. The remaining, intermediate apertures 135 may symmetrically and alternately vary in size around the disk in directions from the smallest aperture 135A to the largest aperture 135B as shown in FIG. 12. The disk 130 of FIG. 12 may be located on the inner nozzle so that the smallest separate flow distributing aperture 135A is aligned with the shell component entry point 60, the largest aperture 135B is diametrically opposite the shell entry point 60, and the remaining apertures 135 which are of equal size are equally distanced from the shell component entry point 60. Also, as shown in FIG. 12 alternating apertures 135 increase in size in a direction away from the shell component entry point 60. In other embodiments, the remaining, intermediate apertures may symmetrically increase in size around the disk in directions from the smallest aperture to the largest aperture, with the smallest aperture being aligned with the shell component entry point.

The insert may preferably include a locating member for aligning the insert within the nozzle assembly for diverting the flow of the shell component. The locating member aligns the insert so that the insert prevents excessive flow along a side or portion of the annular passageway which is at or adjacent to an entry point of the shell component into the annular passageway. The locating member also prevents substantial, if any, rotational movement of the insert about the inner nozzle or filler passageway, and maintains the insert in a fixed position relative to the entry point. In embodiments of the invention, the locating member aligns the insert within the nozzle assembly so that flow apertures of the insert which are equally sized are located about equidistant from the shell component entry point.

As shown in FIGS. 1, 2, 5, 6, 7, 9, 10, and 11, the locating member may be a projection or tab 150 which fits into or within the shell component entry point 60 into the annular passageway 15. The tab 150 is located on the upstream side of the insert disk, at or near the outer periphery of the insert disk and does not substantially block the entry point 60, as shown in FIG. 7. In the embodiments of FIGS. 9, 10, and 11, the tab 60 is located about equally distanced from the two large diametrically opposed flow distributing apertures. As shown in FIG. 7, the tab 60 may extend from the interface 108 of the upstream and downstream manifold sections 84, 86 into the upstream manifold section 84.

In other embodiments, the locating member may be one or more scallops or notches 125 located in the inner periphery 129 of the insert 130 as shown in FIGS. 8 and 12. The at least one notch, may engage one or a series of key way type notches, cogs tabs, or raised portions 155 provided on the outer periphery 157 of the inner passageway or nozzle 7A, such that the insert 130 can be positioned and locked in place.

As shown in FIG. 8, the tab or raised portion 155 on the inner nozzle 7A may extend from a body portion 160 of the nozzle 7A longitudinally along the outer periphery 157 of the nozzle 7A a sufficient distance so that when the nozzle is assembled, the tab 155 extends in the annular passageway 15 slightly into the outer nozzle 13. The insert 130 may thus be positioned within the nozzle assembly 3 so that it rests on the land or ridge 82 of the upstream manifold 84, and is secured from longitudinal movement by the upstream end 80 of the outer nozzle 13. Rotational movement of the insert 130 about the inner nozzle 7A is at least substantially prevented by the locking action or engagement of the tab or ridge portion 155 of the inner nozzle 7A and an inner peripheral notch 125 of the insert 130.

In preferred embodiments of the present invention, the total cross-sectional area of the flow distributing apertures of the apertured disk insert is greater than or substantially equal to the cross sectional area of the shell component entry point so as to at least substantially maintain a constant mass flow rate of the shell component and avoid a substantial increase in back-pressure in feeding of the shell component to the outer or annular passageway.

In other aspects of the present invention, a mogul or starch depositor die head or manifold and nozzle assembly is provided where a plurality of flow distributing apertures, bores, or passageways are included in the manifold without the need for an apertured disk insert. In these aspects of the invention, a plurality of flow distributing apertures, bores, grooves, or passageways, are built directly into or formed in the manifold to at least substantially evenly distribute the shell component within the annular passageway before the shell component contacts and partially enrobes the filler component which is fed through the inner passageway or nozzle.

Figure 13:
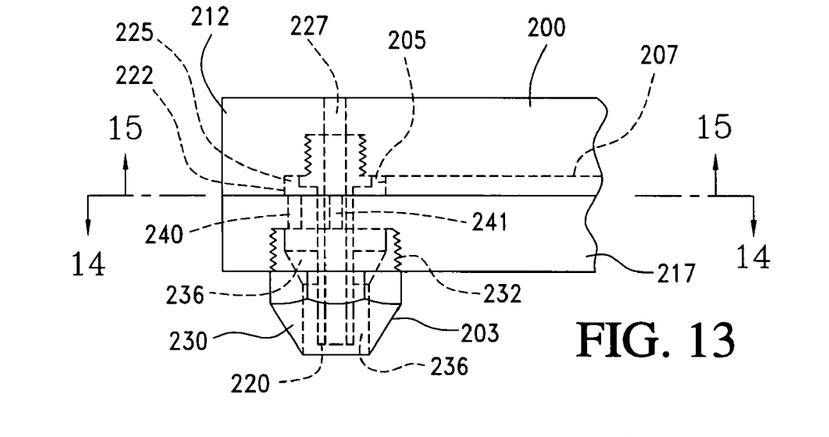
FIG. 13 is a partial side elevational view of a starch deposition die head or manifold and nozzle assembly with a single side entry point for the shell component and a plurality of flow distributing apertures for the shell component which are in the form of bores directly in the manifold in accordance with another embodiment of the present invention.
Figure 14:
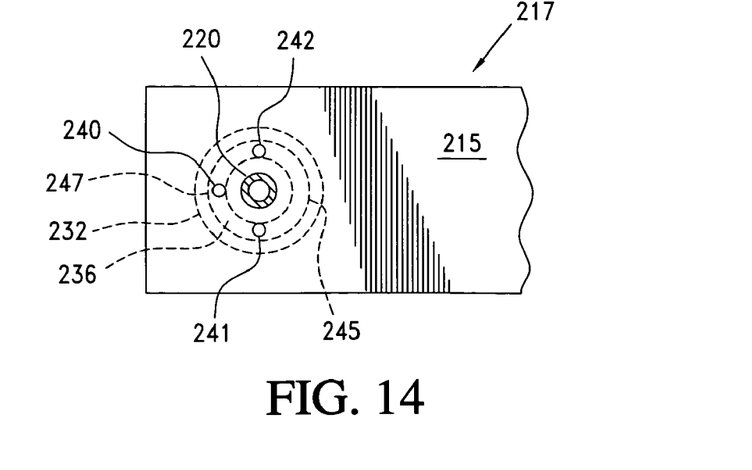
FIG. 14 is a top view along line 14-14 of FIG. 13 showing the upstream face of the downstream die head or downstream manifold section of the manifold, and a cross-section of the inner nozzle of the nozzle assembly of FIG. 13.
Figure 15:
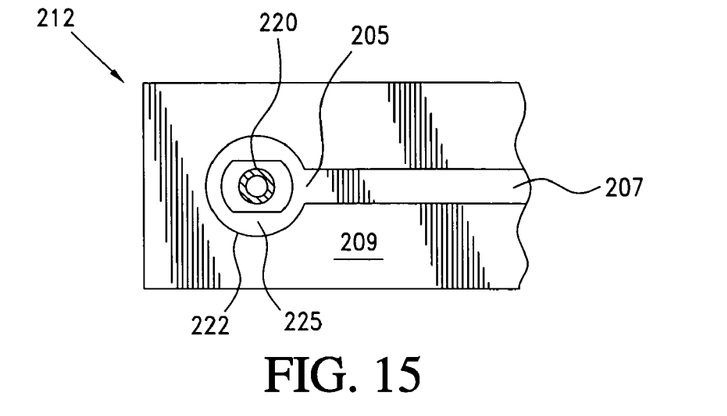
FIG. 15 is a bottom view along line 15-15 of FIG. 13 showing the downstream face of the upstream die head or upstream manifold section of the manifold, and a cross-section of the inner nozzle of the nozzle assembly of FIG. 13.

In the embodiment of FIGS. 13, 14, and 15 the die head or manifold 200 has a nozzle assembly 203 with a single side entry point 205 for the shell component. The single side entry point 205 for each nozzle assembly 203 is fed by a shell component feed passageway 207 which may be a groove in the downstream surface 209 of an upstream manifold section 212, which in turn is sealed against the upstream surface 215 of a downstream die head or manifold section 217. The inner nozzle 220 of the nozzle assembly 203 is threaded into the upstream manifold 212 through an inner nozzle bore 222 to form an annular passageway 225 within the upstream manifold section 212. The filler component may be fed through a filler component feed bore or passageway 227 in the upstream manifold section 212 into the inner nozzle 220. The outer nozzle 230 of the nozzle assembly 203 may be threaded into an outer nozzle bore or nozzle cavity 232 within the downstream manifold section 217 to form an annular passageway 236 within the downstream manifold section 217.

The annular passageway 225 in the upstream manifold section 212 is in fluid communication with the annular passageway 236 in the downstream manifold section 217 by a plurality of flow distributing apertures or bores 240, 241, 242 in the downstream manifold section 217. As shown in FIGS. 13 and 14, the flow distributing apertures or bores 240, 241, 242 may start at the upstream surface 215 of the downstream manifold section 217 and extend downwardly into the annular passageway 236. The upstream surface 215 of the downstream manifold section 217 diverts the flow of the shell component from the shell entry point side 245 towards the opposing side 247 of the annular passageway 225 and into the flow distributing apertures or passageways 240, 241, and 242.

The flow distributing apertures or bores may be arranged in similar manner with respect to the single shell component entry point as described for the flow distributing apertures of the inserts and as shown in FIGS. 1, 2, 5, 6, 7, 8, 9, 10, 11, and 12. For example, as shown in FIGS. 13 and 14, there are three flow distributing apertures or bores 240, 241, and 242. Two bores 241, 242 are about equally sized are placed diametrically opposite each other. A third, smaller aperture or bore 240 is located at about 90° from the two other apertures or bores 241, 242. The third, smaller aperture 240 is about diametrically opposite the entry point 205 of the shell component. The two diametrically opposed apertures 241, 242 are about equally spaced from the shell entry point 205. The plurality of flow distributing apertures or bores 240, 241, 242 are located around the inner filler tube or passageway 220 so as to at least substantially evenly distribute the shell component within the annular passageway 236 before the shell component contacts and enrobes the filler component which is fed through the inner filler tube or passageway 220.

The total cross-sectional area of the flow distributing apertures or bores in the downstream die head or manifold section is greater than or substantially equal to the cross sectional area of the shell component single side entry point so as to at least substantially maintain a constant mass flow rate of the shell component and avoid a substantial increase in back-pressure in feeding of the shell component to the outer or annular passageway.

In other embodiments of the invention which do not employ an apertured insert disk, flow distributing apertures may be provided as a plurality of side entry points for the shell component. At least two side entry points for the shell component may be employed and positioned to distribute the shell component at least substantially evenly throughout an annular passageway in each nozzle assembly prior to contact of the filler component and the shell component so that the filler component is at least substantially centered within the shell component when the filler and shell components are contacted.

Each side entry point may be fed by separate shell component feed passageways, which are fed by a common or inlet shell component feed passageway. In preferred embodiments, the shell entry points may oppose each other in the annular passageway so that upon contact of the shell component with the filler component, the flow of the shell component from the opposing entry points maintain the flow of the filler component at least substantially along a central longitudinal axis.

In other embodiments, the shell entry points may be at least substantially equally spaced around the periphery of the annular passageway. For example, three equally spaced and equally sized entry points may be employed. In still other embodiments, the entry points may be differently sized, but positioned to provide at least substantially uniform flow of the shell component within the annular passageway.

In preferred embodiments, preferably only two side entry points for the shell component are employed so as to simplify the design of the manifold. Reducing the number of feed entry points reduces the number of shell feed passageways which need to be accommodated in the manifold.

Figure 16:
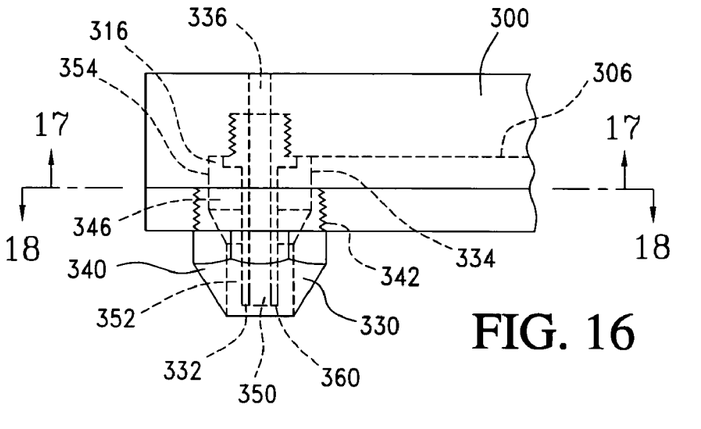
FIG. 16 is a partial side elevational view of a starch deposition die head or manifold and nozzle assembly with two opposing side entry points for the shell component in accordance with another embodiment of the present invention.
Figure 17:
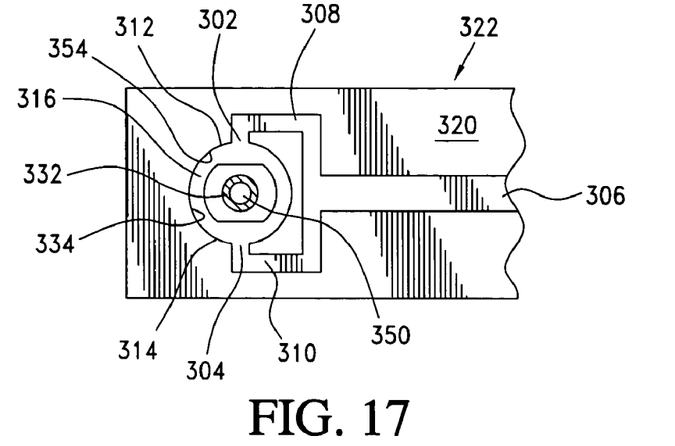
FIG. 17 is a bottom view along line 17-17 of FIG. 16 showing the downstream face of the upstream die head or upstream manifold section of the manifold, and a cross-section of the inner nozzle of the nozzle assembly of FIG. 16.
Figure 18:
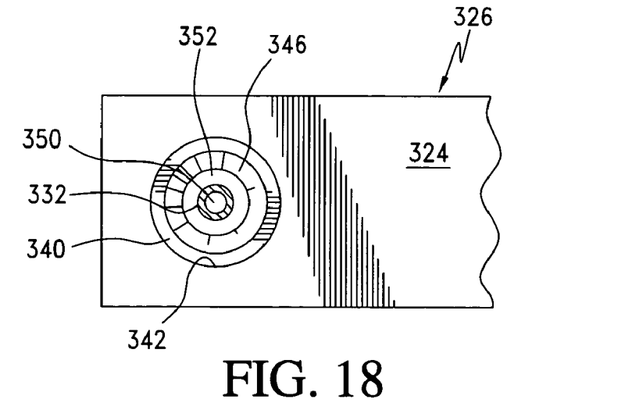
FIG. 18 is a top view along line 18-18 of FIG. 16 showing the upstream face of the downstream die head or downstream manifold section of the manifold, and a cross-section of the inner nozzle of the nozzle assembly of FIG. 16.

In a preferred multi-entry point embodiment shown in FIGS. 16, 17, and 18 the die head or manifold 300 has two opposing side entry points 302, 304 for the shell component. The two entry points 302, 304 are fed by a single passageway 306 in the manifold 300 which splits within the manifold into separate feed passageways 308, 310. The separate feed passageways 308, 310 provide symmetrical fluid paths with essentially equal flow lengths and equal resistance to flow. The separate feed passageways 308, 310 terminate at the opposing points of entry 302, 304 into two opposing sides 312, 314 of the annular passageway 316. As shown in FIGS. 16 and 17, each of the shell component fed passageways 306, 308, 310 may be a groove in the downstream surface 320 of an upstream die head or upstream manifold plate or section 322, which in turn is sealed against the upstream surface 324 of a downstream die head or downstream manifold plate or section 326.

The nozzle assembly 330 has an inner nozzle 332 which is threaded into the upstream manifold plate or section 322 through a bore 334 to form an annular passageway 316 within the upstream manifold section 322 as shown in FIGS. 16 and 17. The filler component may be fed through a filler component feed bore or passageway 336 in the upstream manifold section 322 into the inner nozzle 332.

As shown in FIGS. 16 and 18, the outer nozzle 340 of the nozzle assembly 330 may be threaded into a bore or nozzle cavity 342 within the downstream manifold plate or section 326 to form an annular passageway 346 within the downstream manifold section 326 which is in fluid communication with the annular passageway 316 in the upstream manifold section 322.

As shown in FIGS. 16 and 17, each nozzle assembly 330 connected to the manifold 300 has an inner passageway 350 for a filler component, and a concentric annular passageway 352 for a shell component, where the annular passageway has an outer wall 354 partially formed by the manifold 300. The two opposing side entry points 302, 304 for the shell component into the annular passageway 316 are positioned in the outer wall 354 of the annular passageway to at least substantially evenly distribute the shell component within the annular passageway 352 before the shell component contacts the filler component which is fed through the inner passageway 350. Upon contact of the shell component with the filler component within the nozzle assembly 330 at and downstream of the exit end or tip 360 of the inner passageway 350 or inner nozzle 332, the flow of the shell component from the entry points 302, 304 maintain the flow of the filler component at least substantially along a central longitudinal axis of the nozzle assembly 330.

After the center-filled confection is free from the nozzle, it may be cooled or conditioned and further processed for packaging in conventional manner. For example, after cooling and removal from the starch molds, the center filled confection may oiled and polished in a drum and then packaged in bags using known methods and apparatus.

Any conventional filler materials and shell materials for gummy candies, jelly candies, fruit snacks, and hard candies may be used in the methods and apparatus of the present invention for making center filled confections. For example the shell and filler components may include one or more of fruit juices, fruit concentrates, and fruit purees, sweeteners such as high fructose corn syrup, corn syrup, sugars such as sucrose and dextrose, maltitol syrup, maltodextrins, and sorbitol, gelling agents such as pectin, gelatin, hydrocolloids, and modified food starches, such as modified corn starch, edible acids such as citric acid, edible buffering agents such as sodium citrate, coloring, flavoring, preservatives, and nutrients such as vitamins and minerals. Exemplary formula ranges are 30% by weight to about 60% by weight corn syrups, 15% by weight to about 45% by weight sucrose, about 1% by weight to about 80% by weight other sweeteners such as dextrose, maltitol syrup and maltodextrin, about 0.01% by weight to about 10% by weight gelling agents such as pectin gelatin, modified starch, and other hydrocolloids, about 0.01% by weight to about 1% by weight of buffering agents such as sodium citrate, and about 0.01% by weight to about 5% by weight of color, flavor, or acid.

The shell component and the filler component may be made in known manner and may have the same or different flavors and/or colors, and about the same or substantially different viscosities. The shell component may be transparent or translucent so that the center filling is visible through the shell component. The filling may be aerated, liquid, semi-liquid or solid at room temperature. The viscosity of the shell component may be relatively low, but still higher than the viscosity of the filler component.

Relatively high liquid filler component contents may be consistently achieved without substantial, if any leakage or bleed-out problems. It has been found that for a given high level of liquid filler loading, an unexpectedly, substantially smaller percentage of product exhibits leakage compared to products produced using conventional starch deposition equipment which does not have the flow distributing apertures of the present invention. Exemplary liquid filler component contents may be from about 20% by weight to about 25% by weight, or more, based upon the total weight of the shell and filler components, while achieving an unexpectedly low level of product leakage.

Center-filled confections obtained using the methods and apparatus of the present invention have substantially uniformly thick walls, and are durable during material handling processes employed after deposition and molding such as oiling, polishing, and packaging. The center filled confections may be produced with substantially uniformly thick side walls in a wide variety of shapes, such as fruit shapes, gum drop shapes, jelly bean shapes, animal, fish, or plant shapes, and the like. Mold cavities or impressions which have a maximum depth dimension which is substantially the same as or deeper than its largest width-wise dimension, or visa versa may be employed. The products exhibit long term shelf life in bags or pouches without substantial leaking of filler. They are non-sticky, and have a desirable appearance, even when the shell is translucent or transparent thereby making the filler component visible through the shell.

What is claimed is:

1. Apparatus for producing center-filled confections comprising:
   a. a manifold,
   b. at least one nozzle assembly connected to said manifold, each nozzle assembly comprising an inner passageway for a filler component, and a concentric annular passageway for a shell component,
   c. a removable disk insert comprising a central aperture and a plurality of apertures contiguous with the central aperture for feeding said shell component into said annular passageway, wherein the central aperture and the flow distributing apertures form a single aperture and insertion of the insert on an inner nozzle of the nozzle assembly creates separate flow distributing apertures, and wherein the apertures at least substantially evenly distribute the shell component within the annular passageway before the shell component contacts and partially enrobes a filler component which is fed through said inner passageway, and d. at least one mold into which the partially enrobed filler component is deposited from each of said at least one nozzle assembly to shape the partially enrobed filler component and to obtain a center-filled confection wherein the shell walls are at least substantially uniformly thick.

2. Apparatus as claimed in claim 1 wherein said manifold is a split manifold comprising an upstream section or plate and a downstream section or plate, and said filler component and said shell component are each supplied into said upstream section or plate.

3. Apparatus as claimed in claim 1 wherein said flow distributing apertures are located around said inner filler passageway so as to at least substantially evenly distribute the shell component within the annular passageway before the shell component contacts and enrobes a filler component which is fed through said inner filler passageway.

4. Apparatus as claimed in claim 3 wherein said flow distributing apertures are located within a lower manifold plate of said manifold.

5. Apparatus as claimed in claim 1 wherein the shell component is supplied to said manifold through a shell component feed passageway which terminates at a shell component entry point in said annular passageway, said entry point being located upstream of said disk.

6. Apparatus as claimed in claim 1 wherein said apertures of said disk insert divert flow of said shell component away from a side or portion of the annular passageway where an entry point of said shell component is located toward an opposing side or portion of said annular passageway.

7. Apparatus as claimed in claim 6 wherein the total cross-sectional area of the apertures of said disk insert is greater than or substantially equal to the cross sectional area of said entry point so as to at least substantially maintain a constant mass flow rate of the shell component and avoid a substantial increase in back-pressure in feeding of the shell component to the outer passageway.

8. Apparatus as claimed in claim 1 wherein said disk insert comprises a locating member for aligning said insert so that the insert prevents excessive flow along a side or portion of the annular passageway which is at or adjacent to an entry point of said shell component into said annular passageway.

9. Apparatus as claimed in claim 1 wherein said disk insert comprises a locating member for aligning the insert, said locating member comprising a tab which fits into or within an entry point of said shell component into said annular passageway.

10. Apparatus as claimed in claim 9 where said tab is located on the upstream side of the insert disk, at or near the outer periphery of the insert disk.

11. Apparatus as claimed in claim 8 wherein said locating member is at least one notch located in an inner periphery of the insert, and said at least one notch engages a tab or raised portion on the outer periphery of said inner passageway.

12. Apparatus as claimed in claim 1 wherein each nozzle assembly comprises an outer nozzle and an inner nozzle which form said annular passageway, said apertures are in a disk insert, and the insert is positioned at the upstream end of the outer nozzle.

13. Apparatus as claimed in claim 6 wherein said apertures increase in size in a direction away from said entry point.

14. Apparatus as claimed in claim 12 wherein the disk insert is held in place between the upstream end of the outer nozzle and a land or ridge in the manifold.

15. Apparatus as claimed in claim 14 wherein the disk insert comprises a locating member for aligning the insert, said locating member comprising a tab which fits into or within an entry point of said shell component into said annular passageway.

16. Apparatus for producing center-filled confections comprising:
  a. a manifold,
  b. more than one nozzle assembly connected to said manifold, each nozzle assembly comprising an inner nozzle having an inner passageway for a filler component, an outer nozzle having an inner passageway for a shell component, said inner nozzle and said outer nozzle forming a concentric annular passageway for said shell component,
  c. a feed passageway in said manifold for feeding said shell component into said annular passageway, said feed passageway terminating at an entry point into said annular passageway, and
  d. an apertured insert for distributing flow of said shell component, said apertured insert comprising:
    1. a central aperture through which said inner nozzle passes,
    2. a plurality of flow distributing apertures contiguous with the central aperture, said flow distributing apertures being located within said annular passageway for distributing flow of said shell component, wherein at least one of the plurality of flow distributing apertures and the central aperture form a single aperture, and
    3. a locating member on said insert for aligning and maintaining the insert in a fixed position relative to said entry point.

17. Apparatus as claimed in claim 16 wherein the total cross-sectional area of said flow distributing apertures of said apertured insert is greater than or substantially equal to the cross sectional area of said entry point.

18. Apparatus as claimed in claim 16 wherein said locating member comprises a tab which fits into or within said entry point of said shell component into said annular passageway.

19. Apparatus as claimed in claim 18 where said tab is located on the upstream side of the insert at or near the outer periphery of the insert.

20. Apparatus as claimed in claim 16 wherein said locating member comprises at least one notch located in an inner periphery of the insert, and said at least one notch engages a tab or raised portion on the outer periphery of said inner nozzle.

21. Apparatus as claimed in claim 16 wherein there is only one entry point in each annular passageway for the shell component, and said entry point is located at a side of said annular passageway.

22. Apparatus for producing center-filled confections comprising:
  a. a manifold, wherein said manifold is a split manifold comprising an upstream section and a downstream section, and a filler component and a shell component are each supplied into said upstream section,
  b. more than one nozzle assembly connected to said manifold, each nozzle assembly comprising an inner passageway for the filler component, and a concentric annular passageway for the shell component, said annular passageway having an outer wall partially formed by said manifold, c. at least two side entry points for said shell component into said annular passageway which are positioned in the outer wall of the annular passageway to at least substantially evenly distribute the shell component within the annular passageway before the shell component contacts the filler component which is fed through said inner passageway, wherein upon contact of the shell component with the filler component, the flow of the shell component from the entry points maintain the flow of the filler component at least substantially along a central longitudinal axis, and d. at least one mold into which the filler component and shell component are deposited to obtain a center-filled confection wherein the shell walls are at least substantially uniformly thick and the filler component is completely enrobed with the shell component.

23. Apparatus as claimed in claim 22 wherein said at least two entry points are two substantially opposing entry points.

24. Apparatus as claimed in claim 23 wherein said at least two entry points are fed by a single passageway in said manifold which splits within the manifold into separate passageways to provide symmetrical fluid paths and opposing points of entry into said annular passageway.

* * * * *